(12) United States Patent
Li et al.

(10) Patent No.: US 11,119,335 B2
(45) Date of Patent: Sep. 14, 2021

(54) DISPLAY PANEL, CONTROLLING METHOD AND FABRICATING METHOD THEREOF

(71) Applicants: BOE Technology Group Co., Ltd., Beijing (CN); Beijing BOE Display Technology Co., Ltd., Beijing (CN)

(72) Inventors: Xiaohu Li, Beijing (CN); Minghui Zhang, Beijing (CN); Hanyan Sun, Beijing (CN); Huaxu Bao, Beijing (CN); Inho Park, Beijing (CN); Weitao Chen, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 553 days.

(21) Appl. No.: 16/080,602

(22) PCT Filed: Mar. 13, 2018

(86) PCT No.: PCT/CN2018/078823
§ 371 (c)(1),
(2) Date: Aug. 28, 2018

(87) PCT Pub. No.: WO2019/037408
PCT Pub. Date: Feb. 28, 2019

(65) Prior Publication Data
US 2021/0181526 A1 Jun. 17, 2021

(30) Foreign Application Priority Data
Aug. 21, 2017 (CN) .......................... 201710719922.1

(51) Int. Cl.
G02F 1/133 (2006.01)
H04N 13/302 (2018.01)
(Continued)

(52) U.S. Cl.
CPC ........... *G02B 30/40* (2020.01); *H04N 13/302* (2018.05); *H04N 13/366* (2018.05); *G02F 1/133524* (2013.01)

(58) Field of Classification Search
None
See application file for complete search history.

(56) References Cited

U.S. PATENT DOCUMENTS

2008/0084512 A1 4/2008 Brott et al.
2008/0316597 A1 12/2008 Tsai et al.
(Continued)

FOREIGN PATENT DOCUMENTS

CN 101101378 A 1/2008
CN 101561571 A 10/2009
(Continued)

OTHER PUBLICATIONS

First Office Action in the Chinese Patent Application No. 201710719922. 1, dated Jan. 2, 2020; English translation attached.
(Continued)

*Primary Examiner* — Patricia I Young
(74) *Attorney, Agent, or Firm* — Intellectual Valley Law, P.C.

(57) ABSTRACT

The present application describes a display panel having an array substrate; a counter substrate facing the army substrate; and a light guide grating layer on a side of the array substrate distal to the counter substrate. The light guide grating layer in a three-dimensional image display mode is configured to have a plurality of light emitting regions and a plurality of light non-emitting regions alternately arranged, thereby forming a grating. The light guide grating layer is configured to emit light from the plurality of light emitting regions, and configured not to emit light form the plurality
(Continued)

of light non-emitting regions, thereby displaying a three-dimensional image in the display panel.

17 Claims, 9 Drawing Sheets

(51) Int. Cl.
*H04N 13/366* (2018.01)
*G02B 30/40* (2020.01)
*G02F 1/1335* (2006.01)

(56) References Cited

U.S. PATENT DOCUMENTS

| | | |
|---|---|---|
| 2012/0242568 A1 | 9/2012 | Kim et al. |
| 2015/0029584 A1* | 1/2015 | Song .......................... G02F 1/29 359/463 |
| 2015/0109666 A1 | 4/2015 | Wei et al. |
| 2015/0346498 A1* | 12/2015 | Zhong .................. H04N 13/312 349/61 |
| 2016/0161797 A1 | 6/2016 | Wu |
| 2016/0259172 A1 | 9/2016 | Wu |
| 2016/0291334 A1 | 10/2016 | Gu |
| 2018/0149877 A1 | 5/2018 | Lu et al. |

FOREIGN PATENT DOCUMENTS

| | | |
|---|---|---|
| CN | 101726944 A | 6/2010 |
| CN | 102572483 A | 7/2012 |
| CN | 103454807 A | 12/2013 |
| CN | 104216133 A | 12/2014 |
| CN | 104360534 A | 2/2015 |
| CN | 105093546 A | 11/2015 |
| CN | 107024802 A | 8/2017 |
| TW | 200900803 A | 1/2009 |
| WO | 2008045681 A1 | 4/2008 |

OTHER PUBLICATIONS

International Search Report & Written Opinion dated Jun. 8, 2018, regarding PCT/CN2018/078823.
Copy of the Extended European Search Report in the European Patent Application No. 18761996.0, dated Apr. 8, 2021.

* cited by examiner

DISPLAY PANEL, CONTROLLING METHOD AND FABRICATING METHOD THEREOF

CROSS-REFERENCE TO RELATED APPLICATION

This application is a national stage application under 35 U.S.C. § 371 of International Application No. PCT/CN2018/078823, filed Mar. 13, 2018, which claims priority to Chinese Patent Application No. 201710719922.1, filed Aug. 21, 2017, the contents of which are incorporated by reference in the entirety.

TECHNICAL FIELD

The present invention relates to display technology, more particularly, to a display panel, a method of controlling a display panel, and a method of fabricating a display panel.

BACKGROUND

Multi-view display apparatus or three-dimensional display apparatus have been developed as various types of display apparatuses, such as televisions, entertainment systems, gaming systems, mobile phones, and navigation systems. In recent years, naked eye three-dimensional display apparatuses have become a focus of research and development. Typically, the naked eye three-dimensional display apparatuses use either a parallax barrier grating or a lenticular lens grating. The naked eye three-dimensional display apparatuses obviate the need of wearing a glass, making the viewing experience more pleasant and convenient.

SUMMARY

In one aspect, the present invention provides a display panel comprising an array substrate; a counter substrate facing the array substrate; and a light guide grating layer on a side of the array substrate distal to the counter substrate; and wherein the light guide grating layer in a three-dimensional image display mode is configured to have a plurality of light emitting regions and a plurality of light non-emitting regions alternately arranged, thereby forming a grating; and the light guide grating layer is configured to emit light from the plurality of light emitting regions, and configured not to emit light form the plurality of light non-emitting regions, thereby displaying a three-dimensional image in the display panel.

Optionally, the display panel further comprises a light guide grating pitch adjuster configured to adjust a pitch of a plurality of light emitting regions in the light guide grating layer in response to a change of an actual viewing distance between a plurality of view zones and the display panel.

Optionally, the light guide grating pitch adjuster is configured to, upon receiving an image display command for displaying image in the three-dimensional image display mode, acquire the actual viewing distance between the plurality of view zones and the display panel, and configured to adjust the pitch of a plurality of light emitting regions in the light guide grating layer based on the actual viewing distance.

Optionally, the light guide grating pitch adjuster is configured to control formation of the plurality of light emitting regions in the light guide grating layer; and adjust a width of each of the plurality of light emitting regions in the light guide grating layer and the pitch of a plurality of light emitting regions in the light guide grating layer in real time in response to the change of the actual viewing distance in real time.

Optionally, the light guide grating layer comprises a plurality of light guide bars; wherein each of the plurality of light guide bars extends along a direction substantially parallel to a scanning direction of a plurality of gate lines in the display panel; a length direction of each of the plurality of light guide bars is substantially perpendicular to the scanning direction of a plurality of gate lines in the display panel; the light guide grating pitch adjuster is configured to adjust a width of each of the plurality of light emitting regions in the light guide grating layer 104 in response to a change in the actual viewing distance; the light guide grating pitch adjuster is configured to selectively control a plurality of target light guide bars out of the plurality of light guide bars to emit light whereas other light guide bars of the plurality of light guide bars are controlled not to emit light, thereby forming the grating of a plurality of light emitting regions spaced apart by a plurality of light non-emitting regions; and each of the plurality of light emitting regions comprises at least one of the plurality of target light guide bars that is controlled to emit light.

Optionally, the light guide grating pitch adjuster comprises a distance detector configured to detect the actual viewing distance between the plurality of view zones and the display panel; a processor configured to determine a pitch of the plurality of light emitting regions in the light guide grating layer based on the actual viewing distance; and a controller; wherein the processor is configured to generate a first control signal based on the pitch determined by the processor, and transmit the first control signal to the controller and the controller is configured to, upon receiving the first control signal from the processor, selectively control a plurality of target light guide bars out of the plurality of light guide bars to emit light whereas other light guide bars of the plurality of light guide bars are controlled not to emit light, thereby forming the grating of a plurality of light emitting regions spaced apart by a plurality of light non-emitting regions.

Optionally, the display panel further comprises a plurality of light sources electrically connected to the controller; wherein each of the plurality of light sources is attached to a lateral side of one of the plurality of light guide bars.

Optionally, wherein each of the plurality of light guide bars comprises one of a plurality of optical fibers encapsulated in an encapsulating layer; the encapsulating layer has a refractive index less than that of the plurality of optical fibers; and the plurality of light sources include a plurality of light emitting diodes chips electrically connected to the controller; wherein the light guide grating layer comprises a plurality of light guide points in each of the plurality of light guide bars configured to disrupt light total reflection locally and reflect light out of the light guide grating layer.

Optionally, the plurality of light guide points are a plurality of vias in the encapsulating layer, each of which connecting one of the plurality of optic fibers to the light emitting side of the light guide grating layer; a height direction of the plurality of vias is substantially parallel to a thickness direction of the array substrate; and a height direction of the plurality of vias is substantially perpendicular to a length direction of the plurality of light guide bars.

Optionally, the plurality of light guide points are a plurality of ink dots, each of the plurality of ink dots is on a side of one of the plurality of optical fibers distal to the array substrate.

Optionally, the light guide grating layer in a two-dimensional image display mode is configured to have a substantially continuous single light emitting region throughout the light guide grating layer.

Optionally, the display panel further comprises a light guide grating pitch adjuster, upon receiving an image display command for displaying image in the two-dimensional image display mode, configured to control the light guide grating layer to form the substantially continuous single light emitting region throughout the light guide grating layer.

Optionally, the light guide grating pitch adjuster comprises a processor, upon receiving a signal indicating the two-dimensional image display mode, is configured to generate a second control signal; and a controller; wherein the light guide grating layer comprises a plurality of light guide bars; each of the plurality of light guide bars extends along a direction substantially parallel to a scanning direction of a plurality of gate lines in the display panel; a length direction of each of the plurality of light guide bars is substantially perpendicular to the scanning direction of a plurality of gate lines in the display panel; wherein the processor is configured to transmit the second control signal to the controller; and the controller, upon receiving the second control signal, is configured to control all of the plurality of light guide bars to emit light, thereby forming the substantially continuous single light emitting region throughout the light guide grating layer.

In another aspect, the present invention provides a method of controlling a display panel; wherein the display panel comprises an array substrate; a counter substrate facing the array substrate; a light guide grating layer on a side of the army substrate distal to the counter substrate; and wherein the light guide grating layer in a three-dimensional image display mode is configured to have a plurality of light emitting regions and a plurality of light non-emitting regions alternately arranged, thereby forming a grating; the light guide grating layer is configured to emit light from the plurality of light emitting regions, and configured not to emit light form the plurality of light non-emitting regions, thereby displaying a three-dimensional image in the display panel; the method comprises upon receiving a signal indicating a three-dimensional image display mode, acquiring an actual viewing distance between a plurality of view zones and the display panel; forming a grating of a plurality of light emitting regions spaced apart by a plurality of light non-emitting regions in a light guide grating layer of the display panel; and adjusting a pitch of the plurality of light emitting regions in the light guide grating layer in response to a change of the actual viewing distance in real time.

Optionally, the light guide grating layer comprises a plurality of light guide bars; wherein each of the plurality of light guide bars extends along a direction substantially parallel to a scanning direction of a plurality of gate lines in the display panel; and a length direction of each of the plurality of light guide bars is substantially perpendicular to the scanning direction of a plurality of gate lines in the display panel; wherein forming the grating of a plurality of light emitting regions spaced apart by a chirality of light non-emitting regions in the light guide grating layer comprises determining a width of each of the plurality of light emitting regions in the light guide grating layer based on the actual viewing distance, thereby determining a pitch of a plurality of light emitting regions in the light guide grating layer; and selectively controlling a plurality of target light guide bars out of the plurality of light guide bars to emit light whereas other light guide bars of the plurality of light guide bars are controlled not to emit light, thereby forming the grating of a plurality of light emitting regions spaced apart by a plurality of light non-emitting regions; wherein each of the plurality of light emitting regions comprises at least one of the plurality of target light guide bars that is controlled to emit light.

Optionally, determining the width of each of the plurality of light emitting regions in the light guide grating layer based on the actual viewing distance comprises acquiring the actual viewing distance; and determining the width of each of the plurality of light emitting regions in the light guide grating layer based on the actual viewing distance.

Optionally, selectively controlling the plurality of target light guide bars out of the plurality of light guide bars to emit light comprises generating a first control signal based on the pitch determined; transmitting the first control signal; and based on the first control signal, selectively controlling the plurality of target light guide bars out of the plurality of light guide bars to emit light.

Optionally, the method further comprises, upon receiving a signal indicating a two-dimensional image display mode, controlling the light guide grating layer to form a substantially continuous single light emitting region throughout the light guide grating layer.

Optionally, the light guide grating layer comprises a plurality of light guide bars; and wherein controlling the light guide grating layer to form the substantially continuous single light emitting region throughout the light guide grating layer comprises upon receiving the signal indicating the two-dimensional image display mode, generating a second control signal; transmitting the second control signal; and controlling all of the plurality of light guide bars to emit light, thereby forming the substantially continuous single light emitting region throughout the light guide grating layer.

In another aspect, the present invention provides a method of fabricating a display panel, comprising providing a base substrate; forming a light guide grating layer on the base substrate; forming an array substrate; forming a counter substrate; assembling the array substrate and the counter substrate into a cell; wherein the light guide grating layer is formed on a side of the array substrate distal to the counter substrate; the light guide grating layer in a three-dimensional image display mode is configured to have a plurality of light emitting regions and a plurality of light non-emitting regions alternately arranged, thereby forming a grating; and the light guide grating layer is configured to emit light from the plurality of light emitting regions, and configured not to emit light form the plurality of light non-emitting regions, thereby displaying a three-dimensional image in the display panel.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional three-dimensional image display apparatuses typically include a parallax barrier grating to direct light emitted from a display panel into a plurality of view zones. e.g., a left eye and a right eye of an observer, thereby enabling the three-dimensional image display. Specifically, the parallax barrier grating is disposed on a light emitting side of the display panel, which is then configured to display two images having optical parallax into respectively into two eyes of the observer. In the conventional three-dimensional image display apparatuses, the physical parameters of the parallax barrier grating are permanently set. For example, the pitch of the grating is non-adjustable. Thus, the viewing distance of the three-dimensional image display is also fixed based on the pitch of the grating. When the observer views the image at a distance away from the viewing distance, she cannot view the image properly.

Accordingly, the present disclosure provides, inter alia, a display panel, a method of controlling a display panel, and a method of fabricating a display panel that substantially obviate one or more of the problems due to limitations and disadvantages of the related art. In one aspect, the present disclosure provides a display panel. In some embodiments, the display panel includes an array substrate; a counter substrate facing the array substrate; and a light guide grating layer on a side of the array substrate distal to the counter substrate. The light guide grating layer in a three-dimensional image display mode is configured to have a plurality of light emitting regions and a plurality of light non-emitting regions alternately arranged, thereby forming a grating. The light guide grating layer is configured to emit light from the plurality of light emitting regions, and configured not to emit light form the plurality of light non-emitting regions, thereby displaying a three-dimensional image in the display panel.

Figure 1:
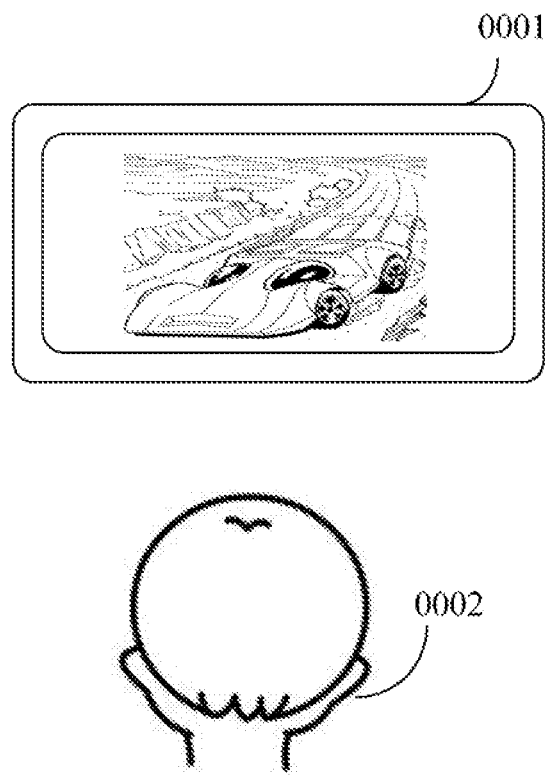
FIG. 1 is schematic diagram of an environment where a display panel according to an embodiment of the present disclosure can be used.

FIG. 1 is schematic diagram of an environment where a display panel according to an embodiment of the present disclosure can be used. Referring to FIG. 1, the environment includes a display apparatus 0001 and a viewer 0002. The display apparatus 0001 may be various appropriate display apparatuses such as a mobile phone, a laptop computer, a television, and so on. Optionally, the display apparatus 0001 is a naked eye stereo display apparatus, and the viewer 0002 can view the three-dimensional image display without the need of wearing a three-dimensional google or helmet. Optionally, the display apparatus 0001 presents offset images that are displayed separately to the left eye and the right eye of the viewer. Both of the offset images are then combined in the brain of the viewer to give the perception of a three-dimensional depth. Optionally, the left eye image includes a plurality of first sub-images arranged in a periodic array, and the right eye image includes a plurality of second sub-images arranged in a periodic array. The plurality of first sub-images and the plurality of second sub-images are offset from each other. Optionally, the plurality of first sub-images and the plurality of second sub-images have a substantially the same width.

Figure 2:
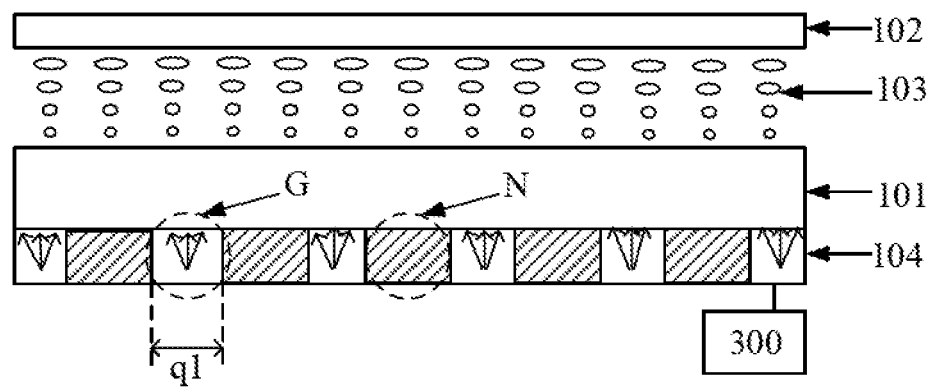
FIG. 2 is a schematic diagram illustrating the structure of a display panel in some embodiments according to the present disclosure.

FIG. 2 is a schematic diagram illustrating the structure of a display panel in some embodiments according to the present disclosure. Referring to FIG. 2, the display panel in some embodiments includes an array substrate 101, a counter substrate 102 facing the array substrate 101. Optionally, the display panel is a liquid crystal display panel further including a liquid crystal layer 103 between the army substrate 101 and the counter substrate 102.

In some embodiments, the display panel further includes a light guide grating layer 104. The light guide grating layer 104 is configured to have a plurality of light emitting regions G and a plurality of light non-emitting regions N alternately arranged, thereby forming a grating. The light guide grating layer 104 is controlled to emit light from the plurality of light emitting regions G, and controlled not to emit light form the plurality of light non-emitting regions N.

Figure 4:
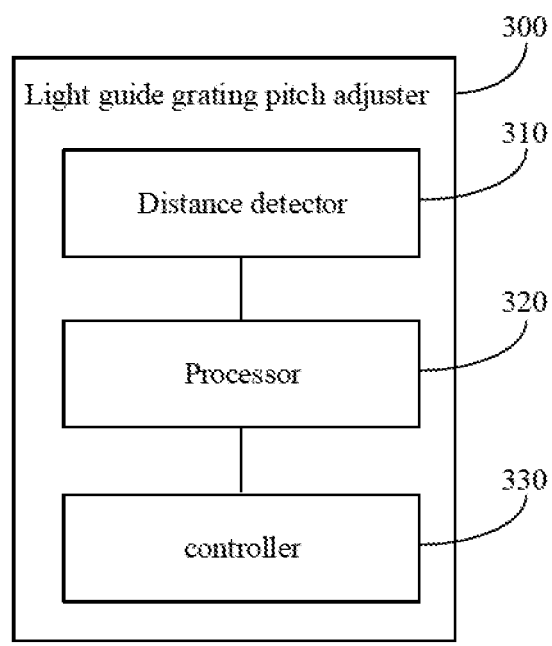
FIG. 4 is a schematic diagram illustrating the structure of a light guide grating pitch adjuster in some embodiments according to the present disclosure.

In some embodiments, the display panel further includes a light guide grating pitch adjuster 300 configured to adjust a pitch of a plurality of light emitting regions G in the light guide grating layer 104 (see, also, FIG. 4). Specifically, the light guide grating pitch adjuster 300 is configured to, upon receiving an image display command for displaying image in a three-dimensional image display mode, acquire an actual viewing distance between the viewer's eyes and the display panel, and configured to adjust the pitch of a plurality of light emitting regions G in the light guide grating layer 104 based on the actual viewing distance. Specifically, the light guide grating pitch adjuster 300 is configured to adjust the pitch by (1) controlling formation of a plurality of light emitting regions G in the light guide grating layer 104; and (2) controlling a width q1 of each of the plurality of light emitting regions G in the light guide grating layer 104. Moreover, the light guide grating pitch adjuster 300 is configured to adjust the width q1 of each of the plurality of light emitting regions G in the light guide grating layer 104 and the pitch of a plurality of light emitting regions G in the light guide grating layer 104 in real time, based on a change of the actual viewing distance in real time. By having this design, the display panel enables the viewer to view the image display in the three-dimensional image display mode at various viewing distances, obviating the need to hold the display panel at a fixed viewing distance in order to view three-dimensional images.

Figure 3:
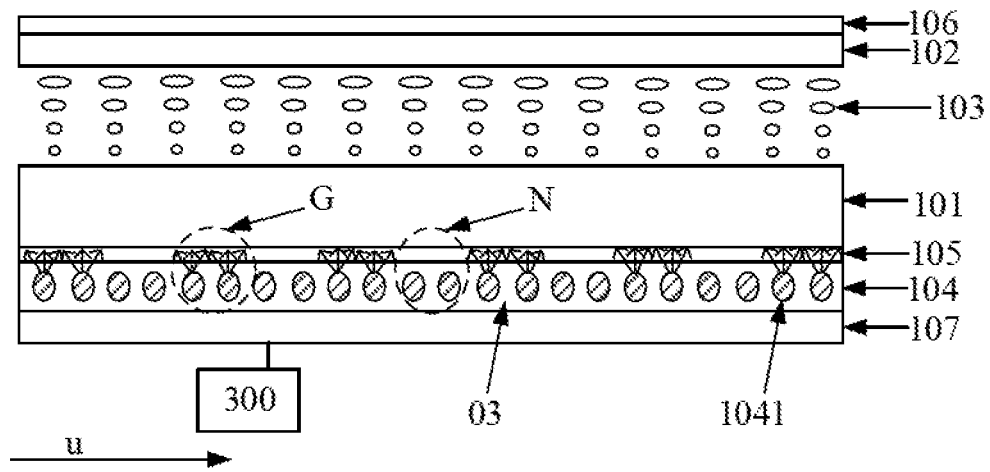
FIG. 3 is a schematic diagram illustrating the structure of a display panel in some embodiments according to the present disclosure.

FIG. 3 is a schematic diagram illustrating the structure of a display panel in some embodiments according to the present disclosure. Referring to FIG. 3, the light guide grating layer 104 includes a plurality of light guide bars 1041. Optionally, each of the plurality of light guide bars 1041 extends along a direction u substantially parallel to the scanning direction of a plurality of gate lines in the display panel. The length direction of each of the plurality of light guide bars 1041 (see. e.g., the direction x in FIG. 5) is substantially perpendicular to the scanning direction of a plurality of gate lines in the display panel (e.g., an extension direction of the plurality of gate lines in the display panel).

As discussed above, the light guide grating pitch adjuster 300 is configured to control the width q1 of each of the plurality of light emitting regions G in the light guide grating layer 104 based on the actual viewing distance. Optionally, the light guide grating pitch adjuster 300 is configured to selectively control a plurality of target light guide bars out of the plurality of light guide bars 1041 to emit light whereas other light guide bars of the plurality of light guide bars 1041 are controlled not to emit light, thereby forming a grating of a plurality of light emitting regions G spaced apart by a plurality of light non-emitting regions N. Optionally, each of the plurality of light emitting regions G includes at least one of the plurality of target light guide bars that is controlled to emit light. Optionally, each of the plurality of light non-emitting regions N includes at least one of the plurality of light guide bars 1041 that is controlled not to emit light. Optionally, and referring to FIG. 3, each of the plurality of light emitting regions G includes two adjacent light guide bars of the plurality of target light guide bars that is controlled to emit light, and each of the plurality of light non-emitting regions N includes two adjacent light guide bars of the plurality of light guide bars 1041 that is controlled not to emit light. FIG. 3 illustrates a light guide grating layer 104 having six light emitting regions of the plurality of light emitting regions G spaced apart by five light non-emitting regions of the plurality of light non-emitting regions N.

FIG. 4 is a schematic diagram illustrating the structure of a light guide grating pitch adjuster in some embodiments according to the present disclosure. Referring to FIG. 4, the light guide grating pitch adjuster 300 in some embodiments includes a distance detector 310 configured to detect an actual viewing distance between the viewer and the display panel; a processor 320 configured to determine a pitch of the plurality of light emitting regions in the light guide grating layer based on the actual viewing distance; and a controller 330. The processor 320 is configured to generate a first control signal based on the pitch determined by the processor 320, and transmit the first control signal to the controller 330. The controller 330 is configured to, upon receiving the first control signal from the processor 320, selectively control a plurality of target light guide bars out of the plurality of light guide bars to emit light whereas other light guide bars of the plurality of light guide bars are controlled not to emit light, thereby forming a grating of a plurality of light emitting regions spaced apart by a plurality of light non-emitting regions. Optionally, the distance detector 310 is an infrared distance detection sensor. Thus, the controller 330 controls a width of each of the plurality of light emitting regions G, thereby controlling the pitch of the plurality of light emitting regions in the light guide grating layer.

Figure 5:
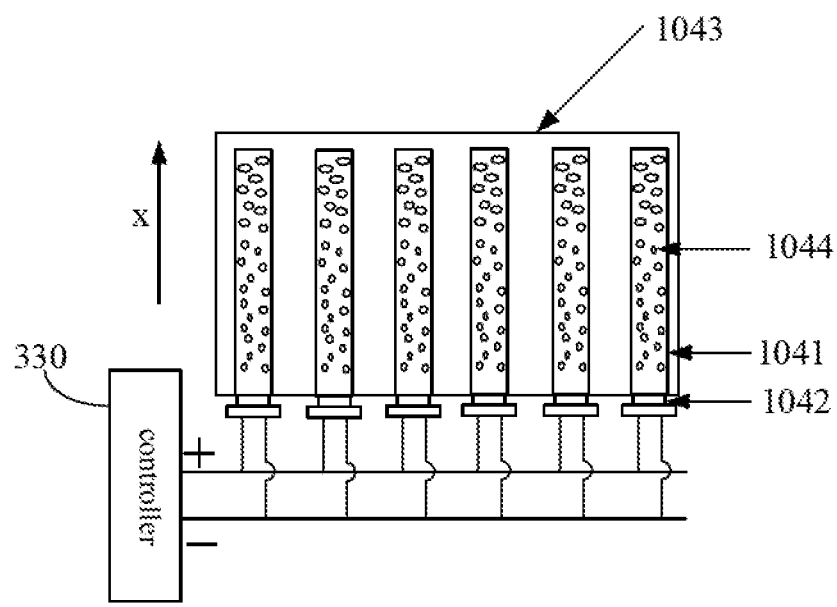
FIG. 5 is a schematic diagram illustrating the structure of a plurality of light sources and a plurality of light guide bars in some embodiments according to the present disclosure.

FIG. 5 is a schematic diagram illustrating the structure of a plurality of light sources and a plurality of light guide bars in some embodiments according to the present disclosure. Referring to FIG. 5, each of the plurality of light guide bars 1041 is electrically connected to the controller 330. The controller 330 is configured to control light emission or non-emission in each of the plurality of light guide bars 1041 upon receiving the first control signal. In one example, the first control signal provides instructions to the controller 330 to control the second, the fourth, and the sixth light guide bars (left to right) to emit light, and control the first, the third, and the fifth light guide bars not to emit light.

Referring to FIG. 3 and FIG. 5, the processor 320 is configured to generate a first control signal based on the pitch determined by the processor 320. The first control signal provides instructions to the controller 330 to control the first, the second, the fifth, the sixth, the ninth, the tenth, the thirteenth, the fourteenth, the seventeenth, the eighteenth, the twenty first, and the twenty second light guide bars of the plurality of light guide bars 1041 to emit light, thereby forming six light emitting regions of the plurality of light emitting regions G. The first and the second light guide bars of the plurality of light guide bars 1041 constitute the first light emitting region of the plurality of light emitting regions G. The fifth and the sixth light guide bars of the plurality of light guide bars 1041 constitute the second light emitting region of the plurality of light emitting regions G. The ninth and the tenth light guide bars of the plurality of light guide bars 1041 constitute the third light emitting region of the plurality of light emitting regions G. The thirteenth and the fourteenth light guide bars of the plurality of light guide bars 1041 constitute the fourth light emitting region of the plurality of light emitting regions G. The seventeenth and the eighteenth second light guide bars of the plurality of light guide bars 1041 constitute the fifth light emitting region of the plurality of light emitting regions G. The twenty first and the twenty second light guide bars of the plurality of light guide bars 1041 constitute the sixth light emitting region of the plurality of light emitting regions G.

Referring to FIG. 5, the light guide grating layer 104 in some embodiments further includes a plurality of light sources 1042. Each of the plurality of light sources 1042 is attached to a lateral side of one of the plurality of light guide bars 1041. Various appropriate light guide bars may be used for making the light guide grating layer 104. Optionally, each of the plurality of light guide bars 1041 is a bar-shaped light guide plate. Optionally, the plurality of light guide bars 1041 includes a plurality of optical fibers. The plurality of optical fibers are encapsulated in an encapsulating layer 1043. Optionally, the encapsulating layer 1043 has a refractive index less than that of the plurality of light guide bars 1041 (e.g., the plurality of optical fibers). The plurality of light sources 1042 are electrically connected to the controller 330. Optionally, the plurality of light sources 1042 include a plurality of light emitting diodes (LEDs). Optionally, the plurality of light sources 1042 include a plurality of micro LEDs. Optionally, the plurality of light sources 1042 include a plurality of light emitting diode (LED) chips, e.g., a plurality of micro LED chips.

Figure 6A:
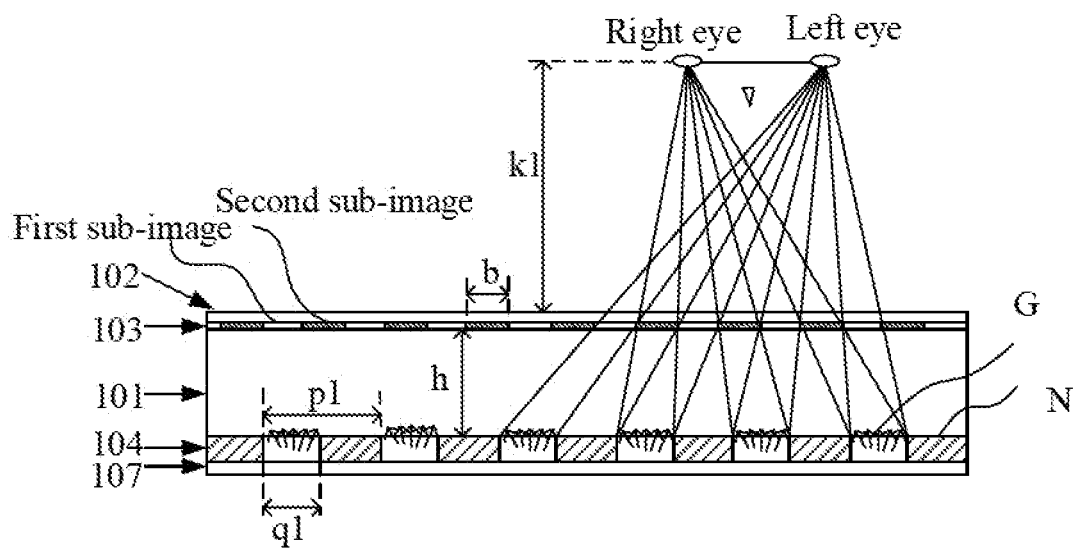
FIGS. 6A and 6B illustrates the working principle of three-dimensional image display in a display panel having an adjustable viewing distance in some embodiments according to the present disclosure.
Figure 6B:
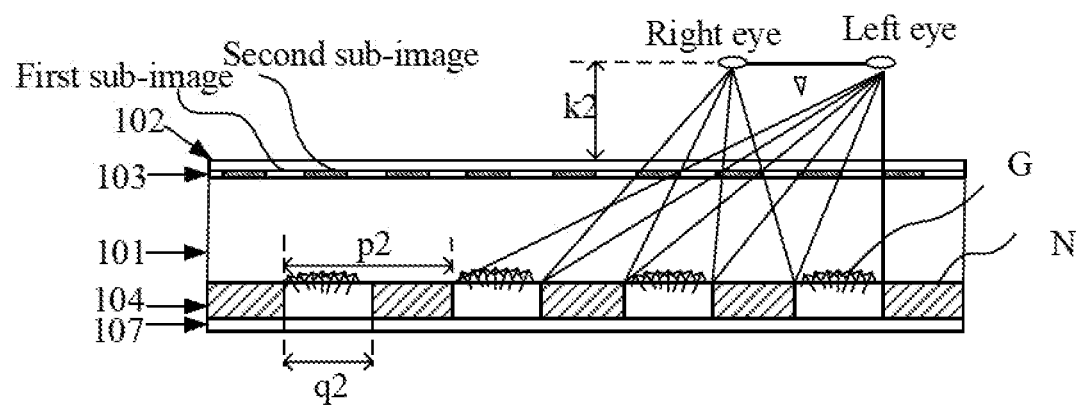

FIGS. 6A and 6B illustrates the working principle of three-dimensional image display in a display panel having an adjustable viewing distance in some embodiments according to the present disclosure. Referring to FIG. 6A, the light guide grating layer 104 is disposed on a base substrate 107, light emitted from the light guide grating layer 104 enters into the array substrate 101, the liquid crystal layer 103, and the counter substrate 102, thereby generating a first sub-image and a second sub-image offset from each other. The left eye of the viewer views the first sub-image, the right eye of the view views the second sub-image. The offset first sub-image and second sub-image are combined in the brain of the viewer to give the perception of a three-dimensional depth. Optionally, the base substrate 107 is a transparent base substrate.

Referring to FIG. 6A, the actual viewing distance at a first time point is k1. As shown in FIG. 6A, the pitch of a plurality of light emitting regions G in the light guide grating layer 104 is denoted as p1 at the first time point. The distance between the liquid crystal layer 103 and the light guide grating layer 104 is denoted as h. A width of each of the plurality of light emitting regions G in the light guide grating layer 104 is denoted as q1 at the first time point. Optionally, q1 is approximately half of the pitch p1. A width of the second sub-image is b.

A correlation between the actual viewing distance k1 and other parameters of the display panel can be determined based on an Equation (1):

$$k1 = \frac{2bh}{p1-2b} = \frac{bh}{q1-b}. \quad (1)$$

Based on Equation (1), different values of the pitch p1 correspond to different viewing distances. Similarly, different values of the width q1 correspond to different viewing distances. Thus, by changing the pitch p1 or by changing the width q1, the viewing distance for viewing the image display in the three-dimensional mode also changes. Based on Equation (1), the pitch p1 (or the width q1) can be adjusted according to a change in the actual viewing distance k1.

Referring to FIG. 6B, the actual viewing distance k2 is less than the actual viewing distance k1 in FIG. 6A. Based on Equation (1), the pitch p1 in FIG. 6A can be adjusted to a pitch p2 in FIG. 6B so that the viewer continues to view the image display in the three-dimensional mode at the actual viewing distance k2. In practice, as discussed above, the width q1 in FIG. 6A can be adjusted to a width q2 in FIG. 6B in order for the viewer continues to view the image display in the three-dimensional mode at the actual viewing distance k2. Specifically, and referring to FIGS. 2-5, the controller 330 is configured to selectively control a plurality of target light guide bars out of the plurality of light guide bars 1041 to emit light whereas other light guide bars of the plurality of light guide bars 1041 are controlled not to emit light, thereby forming a grating of a plurality of light emitting regions G spaced apart by a plurality of light non-emitting regions N. By controlling the number of the plurality of target light guide bars in each of the plurality of light emitting regions G, the width q1 in FIG. 6A can be adjusted to a width q2 in FIG. 6B, and thus the pitch p1 in FIG. 6A can be adjusted to a pitch p2 in FIG. 6B.

After the pitch p2 (and the width q2) is set, light emitted from the light guide grating layer 104 enters into the array substrate 101, the liquid crystal layer 103, and the counter substrate 102, thereby generating a first sub-image and a second sub-image offset from each other. The left eye of the viewer views the first sub-image, the right eye of the view views the second sub-image. The offset first sub-image and second sub-image are combined in the brain of the viewer to give the perception of a three-dimensional depth. Accordingly, the viewer continues to view the image display in the three-dimensional mode at the actual viewing distance k2.

In some embodiments, the light guide grating layer 104 further includes a plurality of light guide points 1044 in each of the plurality of light guide bars 1041. Light entered into the plurality of light guide bars 1041 are transmitted by total reflection. The plurality of light guide points 1044 are configured to disrupt light total reflection locally and reflect light out of the light guide grating layer 104 and into the array substrate 101, the liquid crystal layer 103, and the counter substrate 102.

Figure 7A:
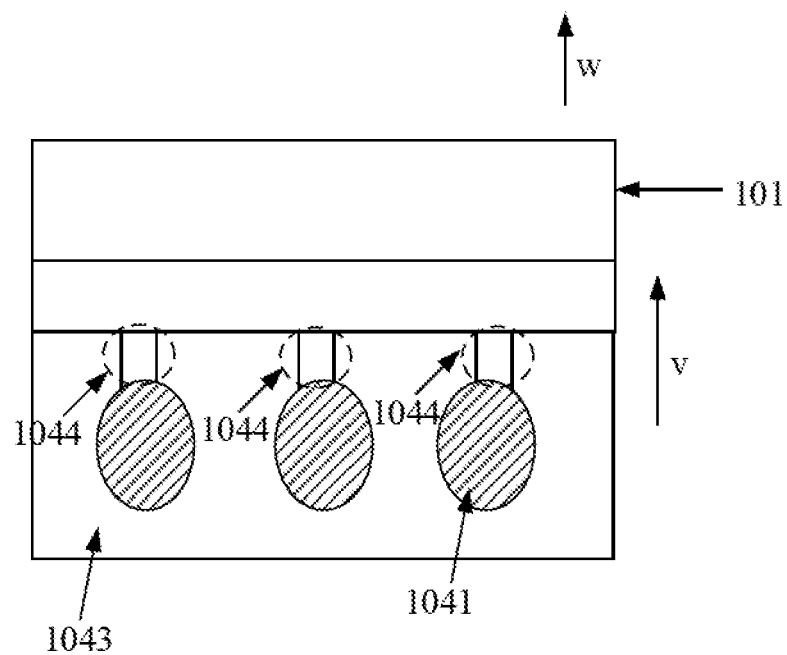
FIGS. 7A and 7B are schematic diagrams illustrating the structures of light guide points on a light guide bar in some embodiments according to the present disclosure.
Figure 7B:
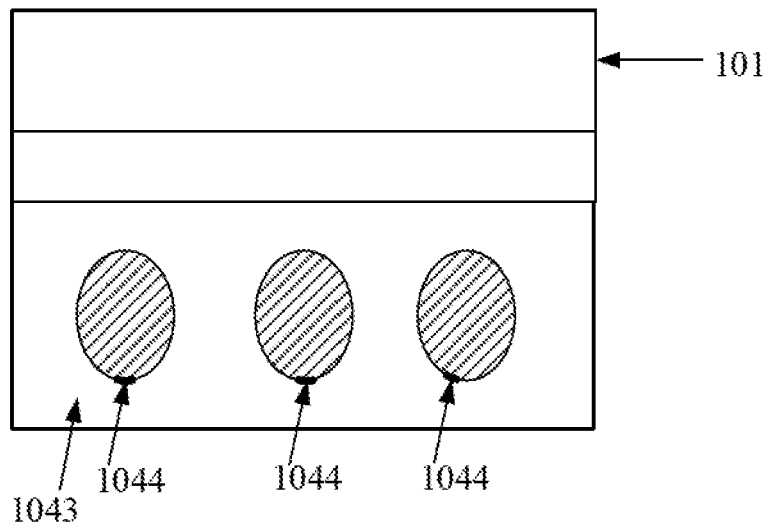

FIGS. 7A and 7B are schematic diagrams illustrating the structures of light guide points on a light guide bar in some embodiments according to the present disclosure. Referring to FIG. 7A, the plurality of light guide points 1044 in some embodiments are a plurality of vias (e.g., blind vias) in the encapsulating layer 1043, each of which connecting one of the plurality of optic fibers to the light emitting side of the light guide grating layer 104. Optionally, the height direction v of the plurality of vias is substantially parallel to the thickness direction w of the array substrate 101. Optionally, the height direction v of the plurality of vias is substantially perpendicular to the length direction of the plurality of light guide bars 1041 (as denoted as x direction in FIG. 5). Referring to FIG. 7B, the plurality of light guide points 1044 in some embodiments are a plurality of ink dots. Optionally, each of the plurality of ink dots is on a side of one of the plurality of optical fibers distal to the array substrate 101. Optionally, the encapsulating layer 1043 is a substantially transparent encapsulating layer.

Referring to FIG. 3, the display panel in some embodiments further includes a lower polarizer 105 on a side of the array substrate 101 proximal to the light guide grating layer 104, an upper polarizer 106 on a side of the counter substrate 102 distal to the liquid crystal layer 103, and a substantially transparent base substrate 107 on a side of the light guide grating layer 104 distal to the array substrate 101.

Figure 8:
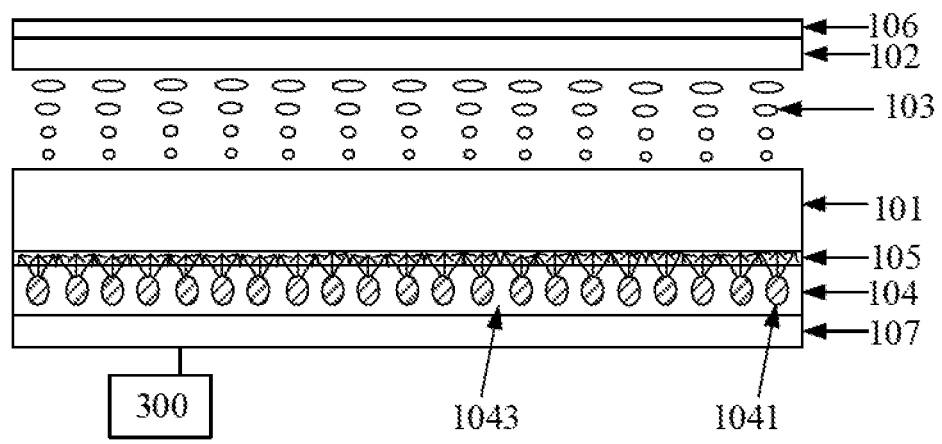
FIG. 8 illustrates the working principle of a two-dimensional image display in a display panel in some embodiments according to the present disclosure.

In some embodiments, the display panel is configured to display a three-dimensional image in a three-dimensional image display mode, and display a two-dimensional image in a two-dimensional image display mode. Accordingly, the display panel in some embodiments is capable of switching between the three-dimensional image display mode and the two-dimensional image display mode. FIG. 8 illustrates the working principle of a two-dimensional image display in a display panel in some embodiments according to the present disclosure. Referring to FIG. 8, in some embodiments, the light guide grating pitch adjuster 300 is configured to receive a signal indicating the two-dimensional image display mode, and is configured to form a substantially continuous single light emitting region throughout the entire light guide grating layer 104. Upon receiving the signal indicating the two-dimensional image display mode, the processor is configured to generate a second control signal, and transmit the second control signal to the controller. The second control signal provides instructions to the controller to control the all of the plurality of light guide bars 1041 to emit light. The controller, upon receiving the second control signal, is configured to control all of the plurality of light guide bars 1041 to emit light, thereby forming a substantially continuous single light emitting region throughout the entire light guide grating layer 104. The display panel is switched from the three-dimensional image display mode to the two-dimensional image display mode.

In some embodiments, the display panel can be switched from the two-dimensional image display mode to the three-dimensional image display mode. In the two-dimensional image display mode, the display panel receives a signal indicating the three-dimensional image display mode. The light guide grating pitch adjuster 300, upon receiving the signal indicating the three-dimensional image display mode, is configured to determine the actual viewing distance between the viewer's eyes and the display panel, and adjust the pitch of a plurality of light emitting regions in the light guide grating layer 104 based on the actual viewing distance. Specifically, the pitch can be adjusted by adjusting the width of each of the plurality of light emitting regions, e.g., by selectively controlling a plurality of target light guide bars out of the plurality of light guide bars 1041 to emit light whereas other light guide bars of the plurality of light guide bars 1041 are controlled not to emit light. The display panel is switched from the two-dimensional image display mode to the three-dimensional image display mode.

In the present display panel, the light guide grating pitch adjuster is configured to, upon receiving an image display command for displaying image in a three-dimensional image display mode, acquire an actual viewing distance between the viewer's eyes and the display panel, and configured to adjust the pitch of a plurality of light emitting regions in the light guide grating layer based on the actual viewing distance. For example, the light guide grating pitch adjuster is configured to control a width of each of the plurality of light emitting regions in the light guide grating layer, thereby adjusting the pitch. The light guide grating pitch adjuster is capable of adjusting the pitch in real time, based on a change of the actual viewing distance in real time. By having this design, the display panel enables the viewer to view the image display in the three-dimensional image display mode at various viewing distances, obviating the need to hold the display panel at a fixed viewing distance in order to view three-dimensional images.

Figure 9A:
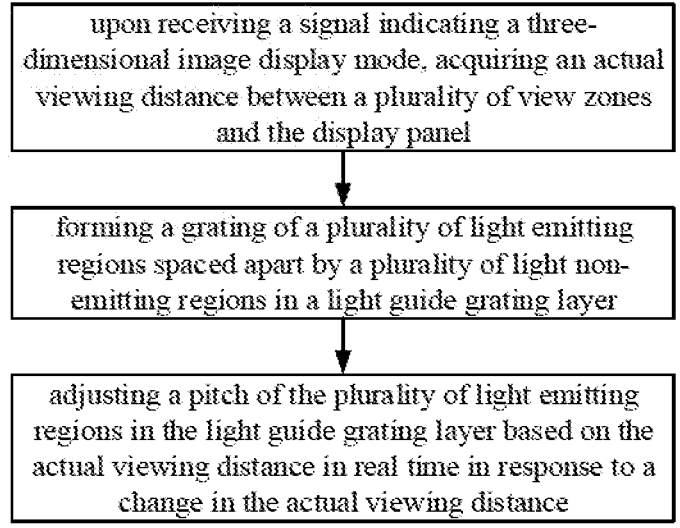
FIGS. 9A to 9F are flow charts illustrating image display methods in some embodiments according to the present disclosure.

In another aspect, the present disclosure provides a method of controlling a display panel described herein. FIGS. 9A to 9F are flow charts illustrating image display methods in some embodiments according to the present disclosure. Referring to FIG. 9A, the method in some embodiments includes, upon receiving a signal indicating a three-dimensional image display mode, acquiring an actual viewing distance between a plurality of view zones and the display panel (e.g., using a light guide grating pitch adjuster); forming a grating of a plurality of light emitting regions spaced apart by a plurality of light non-emitting regions in a light guide grating layer (e.g., using the light guide grating pitch adjuster); and adjusting a pitch of the plurality of light emitting regions in the light guide grating layer in response to a change in the actual viewing distance (e.g., using the light guide grating pitch adjuster).

As shown in FIG. 3, the light guide grating layer 104 includes a plurality of light guide bars 1041. Optionally, each of the plurality of light guide bars 1041 extends along a direction u substantially parallel to the scanning direction of a plurality of gate lines in the display panel. The length direction of each of the plurality of light guide bars 1041 (see, e.g., the direction x in FIG. 5) is substantially perpendicular to the scanning direction of a plurality of gate lines in the display panel (e.g., an extension direction of the plurality of gate lines in the display panel).

Figure 9B:
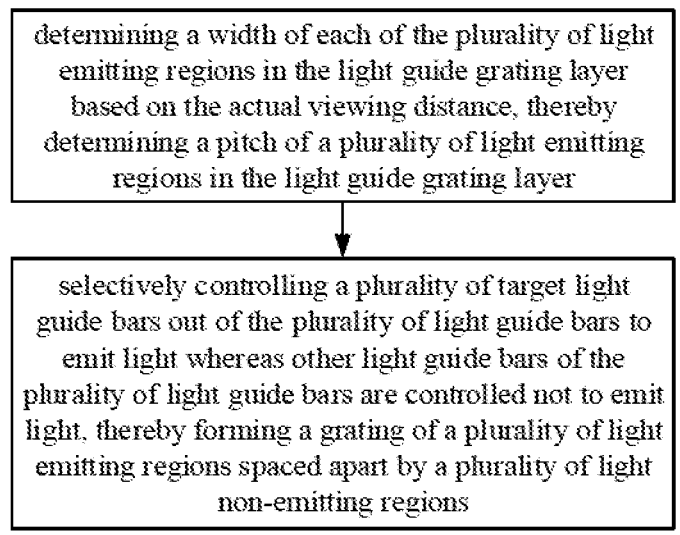

Referring to FIG. 9B, in some embodiments, the step of forming a grating of a plurality of light emitting regions spaced apart by a plurality of light non-emitting regions in a light guide grating layer includes determining a width of each of the plurality of light emitting regions in the light guide grating layer based on the actual viewing distance, thereby determining a pitch of a plurality of light emitting regions in the light guide grating layer (e.g., using the light guide grating pitch adjuster); and selectively controlling a plurality of target light guide bars out of the plurality of light guide bars to emit light whereas other light guide bars of the plurality of light guide bars are controlled not to emit light, thereby forming a grating of a plurality of light emitting regions spaced apart by a plurality of light non-emitting regions. Optionally, each of the plurality of light emitting regions includes at least one of the plurality of target light guide bars that is controlled to emit light.

As shown in FIG. 4, the light guide grating pitch adjuster 300 in some embodiments includes a distance detector 310 configured to detect an actual viewing distance between the viewer and the display panel; a processor 320 configured to determine a pitch of the plurality of light emitting regions in the light guide grating layer based on the actual viewing distance; and a controller 330. Optionally, the distance detector 310 is an infrared distance detection sensor.

Figure 9C:
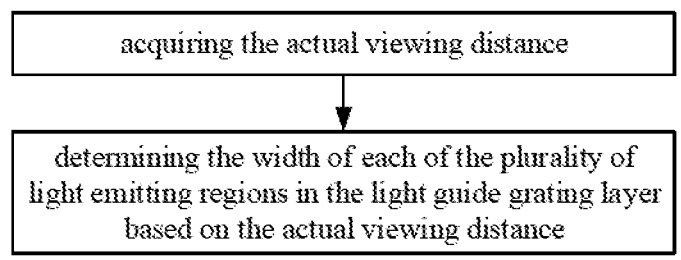

Referring to FIG. 9C, in some embodiments, the step of determining the width of each of the plurality of light emitting regions in the light guide grating layer based on the actual viewing distance (as well as determining the pitch of a plurality of light emitting regions in the light guide grating layer) includes acquiring the actual viewing distance (e.g., using the distance detector); and determining the width of each of the plurality of light emitting regions in the light guide grating layer based on the actual viewing distance (e.g., using the processor).

Figure 9D:
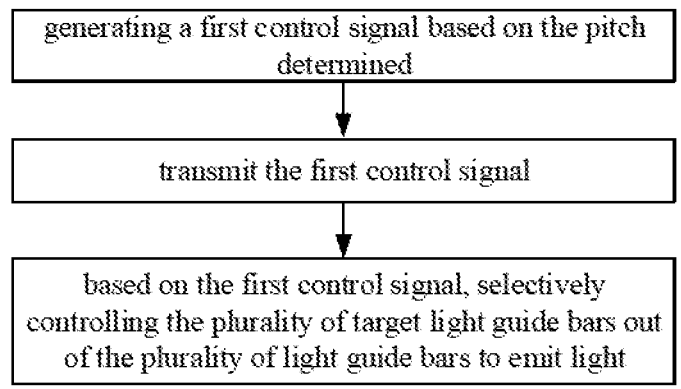

Referring to FIG. 9D, in some embodiments, the step of selectively controlling the plurality of target light guide bars out of the plurality of light guide bars to emit light includes generating a first control signal based on the pitch determined (e.g., using the processor); transmit the first control signal (e.g., to the controller); and based on the first control signal, selectively controlling the plurality of target light guide bars out of the plurality of light guide bars to emit light (e.g., using the controller).

Figure 9E:
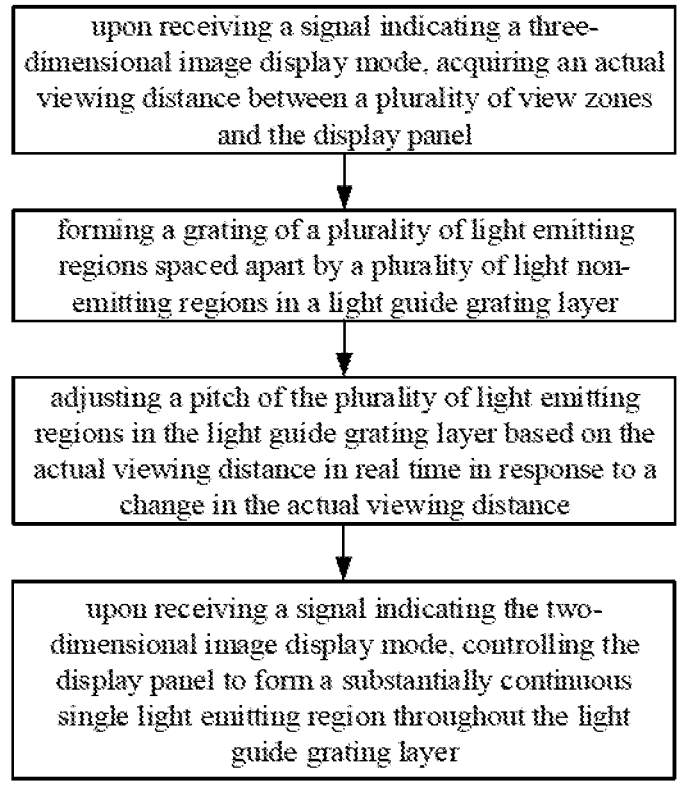

In some embodiments, the method further includes controlling the display panel to display a three-dimensional image in a three-dimensional image display mode, and display a two-dimensional image in a two-dimensional image display mode. Referring to FIG. 9E, the method in some embodiments includes (1) upon receiving a signal indicating a three-dimensional image display mode, acquiring an actual viewing distance between a plurality of view zones and the display panel (e.g., using a light guide grating pitch adjuster); forming a grating of a plurality of light emitting regions spaced apart by a plurality of light non-emitting regions in a light guide grating layer (e.g., using the light guide grating pitch adjuster); and adjusting a pitch of the plurality of light emitting regions in the light guide grating layer in response to a change in the actual viewing distance (e.g., using the light guide grating pitch adjuster); and (2) upon receiving a signal indicating the two-dimensional image display mode, controlling the light guide grating layer to form a substantially continuous single light emitting region throughout the light guide grating layer.

Figure 9F:
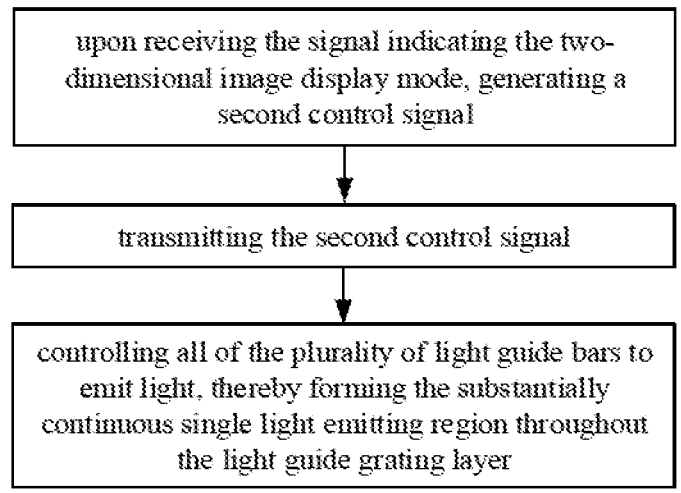

Referring to FIG. 9F, in some embodiments, the step of controlling the light guide grating layer to form the substantially continuous single light emitting region throughout the light guide grating layer includes, upon receiving the signal indicating the two-dimensional image display mode, generating a second control signal (e.g., using the processor); transmitting the second control signal (e.g., to the controller); and controlling (e.g., by the controller) all of the plurality of light guide bars to emit light, thereby forming the substantially continuous single light emitting region throughout the light guide grating layer.

In some embodiments, the method further includes switching the display mode of the display panel from the two-dimensional image display mode to the three-dimensional image display mode. In the two-dimensional image display mode, a signal indicating the three-dimensional image display mode is generated. Upon receiving the signal indicating the three-dimensional image display mode, e.g., by the light guide grating pitch adjuster, the method further includes determining the actual viewing distance between the viewer's eyes and the display panel, and adjusting the pitch of a plurality of light emitting regions in the light guide grating layer based on the actual viewing distance. Specifically, the step of adjusting the pitch includes adjusting the width of each of the plurality of light emitting regions. e.g., by selectively controlling a plurality of target light guide bars out of the plurality of light guide bars to emit light whereas other light guide bars of the plurality of light guide bars are controlled not to emit light. Accordingly, the method can switch the display mode of the display panel from the two-dimensional image display mode to the three-dimensional image display mode.

In the present controlling method, the light guide grating pitch adjuster is configured to, upon receiving an image display command for displaying image in a three-dimensional image display mode, acquire an actual viewing distance between the viewer's eyes and the display panel, and configured to adjust the pitch of a plurality of light emitting regions in the light guide grating layer based on the actual viewing distance. For example, the light guide grating pitch adjuster is configured to control a width of each of the plurality of light emitting regions in the light guide grating layer, thereby adjusting the pitch. The light guide grating pitch adjuster is capable of adjusting the pitch in real time, based on a change of the actual viewing distance in real time. By having this design, the display panel enables the viewer to view the image display in the three-dimensional image display mode at various viewing distances, obviating the need to hold the display panel at a fixed viewing distance in order to view three-dimensional images.

Figure 10A:
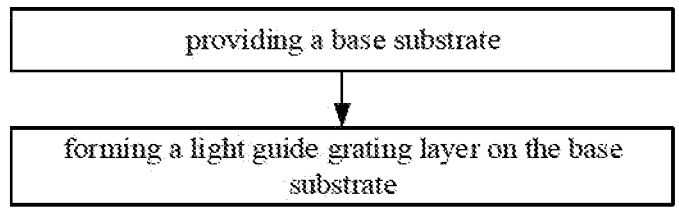
FIGS. 10A to 10B are flowcharts illustrating methods of fabricating a display panel in some embodiments according to the present disclosure.
Figure 10B:
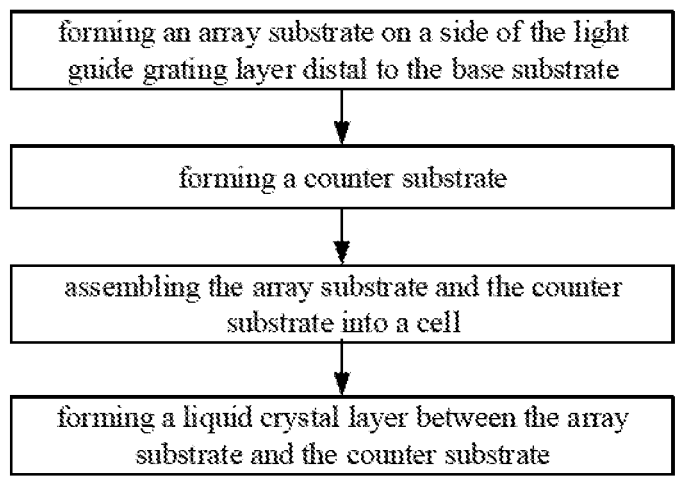
Figure 11:
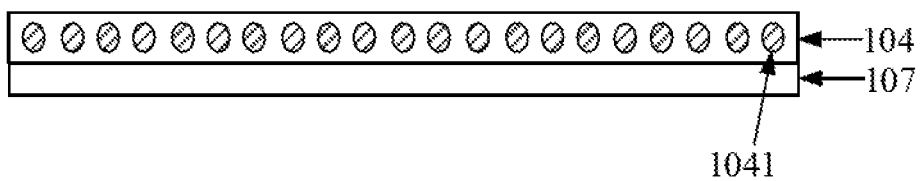
FIG. 11 illustrates a process of forming the light guide grating layer on a base substrate in some embodiments according to the present disclosure.

In another aspect, the present disclosure provides a method of fabricating a display panel. FIGS. 10A to 10B are flow charts illustrating methods of fabricating a display panel in some embodiments according to the present disclosure. Referring to FIG. 10A, the method in some embodiments includes providing a base substrate; forming a light guide grating layer on the base substrate. Optionally, the base substrate is a substantially transparent base substrate. FIG. 1 illustrates a process of forming the light guide grating layer on a base substrate in some embodiments according to the present disclosure. Referring to FIG. 11, a light guide grating layer 104 is formed on a base substrate 107. The light guide grating layer 104 is formed to include a plurality of light guide bars 1041. Optionally, each of the plurality of light guide bars 1041 extends along a direction substantially parallel to the scanning direction of a plurality of gate lines in the display panel. The length direction of each of the plurality of light guide bars 1041 is substantially perpendicular to the scanning direction of a plurality of gate lines in the display panel (e.g., an extension direction of the plurality of gate lines in the display panel).

In some embodiments, the light guide grating layer may be integrated into the display panel. Referring to FIG. 10B, the method in some embodiments further includes forming an array substrate on a side of the light guide grating layer distal to the base substrate; forming a counter substrate; assembling the array substrate and the counter substrate into a cell; and forming a liquid crystal layer between the array substrate and the counter substrate. Optionally, the method further includes forming a lower polarizer on a side of the array substrate proximal to the light guide grating layer, and forming an upper polarizer on a side of the counter substrate distal to the liquid crystal layer.

In some embodiments, the light guide grating layer is separately formed, and subsequently attached to a side of the array substrate distal to the counter substrate.

In some embodiments, the method further includes forming a light guide grating pitch adjuster. The light guide grating pitch adjuster is formed to, upon receiving an image display command for displaying image in a three-dimensional image display mode, acquire an actual viewing distance between the viewer's eyes and the display panel, and configured to adjust the pitch of a plurality of light emitting regions in the light guide grating layer based on the actual viewing distance. Optionally, the step of forming the light guide grating pitch adjuster includes forming a distance detector, forming a processor, and forming a controller.

In a display panel fabricated by the present method, the light guide grating pitch adjuster is configured to, upon receiving an image display command for displaying image in a three-dimensional image display mode, acquire an actual viewing distance between the viewer's eyes and the display panel, and configured to adjust the pitch of a plurality of light emitting regions in the light guide grating layer based on the actual viewing distance. For example, the light guide grating pitch adjuster is configured to control a width of each of the plurality of light emitting regions in the light guide grating layer, thereby adjusting the pitch. The light guide grating pitch adjuster is capable of adjusting the pitch in real time, based on a change of the actual viewing distance in real time. By having this design, the display panel enables the viewer to view the image display in the three-dimensional image display mode at various viewing distances, obviating the need to hold the display panel at a fixed viewing distance in order to view three-dimensional images.

In another aspect, the present disclosure provides a display apparatus having the display panel described herein or fabricated by a method described herein. Examples of appropriate touch control display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention". "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel, comprising:
an array substrate;
a counter substrate facing the array substrate;
a light guide grating layer on a side of the array substrate distal to the counter substrate; and
a light guide grating pitch adjuster;
wherein the light guide grating layer in a three-dimensional image display mode is configured to have a plurality of light emitting regions and a plurality of light non-emitting regions alternately arranged, thereby forming a grating;
the light guide grating pitch adjuster configured to adjust a pitch of the plurality of light emitting regions in the light guide grating layer in response to a change of an actual viewing distance between a plurality of view zones and the display panel;
the light guide grating layer is configured to emit light from the plurality of light emitting regions, and configured not to emit light form the plurality of light non-emitting regions, thereby displaying a three-dimensional image in the display panel,
the light guide grating layer comprises a plurality of light guide bars;
wherein a respective one of the plurality of light guide bars extends along a direction substantially parallel to a scanning direction of a plurality of gate lines in the display panel;
a length direction of the respective one of the plurality of light guide bars is substantially perpendicular to the scanning direction of the plurality of gate lines in the display panel;
the light guide grating pitch adjuster is configured to adjust a width of a respective one of the plurality of light emitting regions in the light guide grating layer in response to a change in the actual viewing distance;
the light guide grating pitch adjuster is configured to selectively control a plurality of target light guide bars out of the plurality of light guide bars to emit light whereas other light guide bars of the plurality of light guide bars are controlled not to emit light, thereby forming the grating of the plurality of light emitting regions spaced apart by the plurality of light non-emitting regions; and
the respective one of the plurality of light emitting regions comprises at least one of the plurality of target light guide bars that is controlled to emit light.

2. The display panel of claim 1, wherein the light guide grating pitch adjuster is configured to, upon receiving an image display command for displaying image in the three-dimensional image display mode, acquire the actual viewing distance between the plurality of view zones and the display panel, and configured to adjust the pitch of the plurality of light emitting regions in the light guide grating layer based on the actual viewing distance.

3. The display panel of claim 1, wherein the light guide grating pitch adjuster is configured to
control formation of the plurality of light emitting regions in the light guide grating layer, and
adjust a width of the respective one of the plurality of light emitting regions in the light guide grating layer and the pitch of the plurality of light emitting regions in the light guide grating layer in real time in response to the change of the actual viewing distance in real time.

4. The display panel of claim 1, wherein the light guide grating pitch adjuster comprises:
a distance detector configured to detect the actual viewing distance between the plurality of view zones and the display panel;
a processor configured to determine the pitch of the plurality of light emitting regions in the light guide grating layer based on the actual viewing distance; and
a controller;
wherein the processor is configured to generate a first control signal based on the pitch determined by the processor, and transmit the first control signal to the controller, and
the controller is configured to, upon receiving the first control signal from the processor, selectively control the plurality of target light guide bars out of the plurality of light guide bars to emit light whereas other light guide bars of the plurality of light guide bars are controlled not to emit light, thereby forming the grating of the plurality of light emitting regions spaced apart by a plurality of light non-emitting regions.

5. The display panel of claim 4, further comprising a plurality of light sources electrically connected to the controller;
wherein a respective one of the plurality of light sources is attached to a lateral side of the respective one of the plurality of light guide bars.

6. The display panel of claim 5, wherein the respective one of the plurality of light guide bars comprises one of a plurality of optical fibers encapsulated in an encapsulating layer;
the encapsulating layer has a refractive index less than that of the plurality of optical fibers; and
the plurality of light sources include a plurality of light emitting diodes chips electrically connected to the controller;
wherein the light guide grating layer comprises a plurality of light guide points in the respective one of the plurality of light guide bars configured to disrupt light total reflection locally and reflect light out of the light guide grating layer.

7. The display panel of claim 6, wherein the plurality of light guide points are a plurality of vias in the encapsulating layer, a respective one of which connecting one of the plurality of optic fibers to a light emitting side of the light guide grating layer;
a height direction of the plurality of vias is substantially parallel to a thickness direction of the array substrate; and
a height direction of the plurality of vias is substantially perpendicular to a length direction of the plurality of light guide bars.

8. The display panel of claim 6, wherein the plurality of light guide points are a plurality of ink dots, a respective one of the plurality of ink dots is on a side of one of the plurality of optical fibers distal to the array substrate.

9. The display panel of claim 1, wherein the light guide grating layer in a two-dimensional image display mode is configured to have a substantially continuous single light emitting region throughout the light guide grating layer.

10. The display panel of claim 9, wherein the light guide grating pitch adjuster is configured to, upon receiving an image display command for displaying image in the two-dimensional image display mode, control the light guide grating layer to form the substantially continuous single light emitting region throughout the light guide grating layer.

11. A display panel, comprising:
an array substrate;
a counter substrate facing the array substrate;
a light guide grating layer on a side of the array substrate distal to the counter substrate; and
a light guide gating pitch adjuster;
wherein the light guide grating layer in a three-dimensional image display mode is configured to have a plurality of light emitting regions and a plurality of light non-emitting regions alternately arranged, thereby forming a grating;
the light guide grating pitch adjuster is configured to adjust a pitch of the plurality of light emitting regions in the light guide grating layer in response to a change of an actual viewing distance between a plurality of view zones and the display panel; and
the light guide grating layer is configured to emit light from the plurality of light emitting regions, and configured not to emit light form the plurality of light non-emitting regions, thereby displaying a three-dimensional image in the display panel;
wherein the light guide grating layer in a two-dimensional image display mode is configured to have a substantially continuous single light emitting region throughout the light guide grating layer;
wherein the display panel further comprises a light guide grating pitch adjuster, upon receiving an image display command for displaying image in the two-dimensional image display mode, configured to control the light guide grating layer to form the substantially continuous single light emitting region throughout the light guide grating layer;
wherein the light guide grating pitch adjuster comprises:
a processor, upon receiving a signal indicating the two-dimensional image display mode, is configured to generate a second control signal; and
a controller;
wherein the light guide grating layer comprises a plurality of light guide bars;
a respective one of the plurality of light guide bars extends along a direction substantially parallel to a scanning direction of a plurality of gate lines in the display panel;
a length direction of the respective one of the plurality of light guide bars is substantially perpendicular to the scanning direction of a plurality of gate lines in the display panel; and
the light guide grating pitch adjuster is configured to adjust a width of a respective one of the plurality of light emitting regions in the light guide grating layer in response to a change in the actual viewing distance;
wherein the processor is configured to transmit the second control signal to the controller, and
the controller, upon receiving the second control signal, is configured to control all of the plurality of light guide bars to emit light, thereby forming the substantially continuous single light emitting region throughout the light guide grating layer.

12. A method of controlling a display panel,
wherein the display panel comprises:
an array substrate;
a counter substrate facing the array substrate;
a light guide grating layer on a side of the array substrate distal to the counter substrate; and
wherein the light guide grating layer in a three-dimensional image display mode is configured to have a plurality of light emitting regions and a plurality of light non-emitting regions alternately arranged, thereby forming a grating;
the light guide grating layer is configured to emit light from the plurality of light emitting regions, and configured not to emit light form the plurality of light non-emitting regions, thereby displaying a three-dimensional image in the display panel;
the method comprises:
upon receiving a signal indicating a three-dimensional image display mode, acquiring an actual viewing distance between a plurality of view zones and the display panel;
forming a grating of the plurality of light emitting regions spaced apart by the plurality of light non-emitting regions in a light guide grating layer of the display panel; and
adjusting a pitch of the plurality of light emitting regions in the light guide grating layer in response to a change of the actual viewing distance in real time;
wherein the light guide grating layer comprises a plurality of light guide bars;
wherein a respective one of the plurality of light guide bars extends along a direction substantially parallel to a scanning direction of a plurality of gate lines in the display panel; and
a length direction of the respective one of the plurality of light guide bars is substantially perpendicular to the scanning direction of a plurality of gate lines in the display panel; and
wherein forming the grating of the plurality of light emitting regions spaced apart by the plurality of light non-emitting regions in the light guide grating layer comprises:
determining a width of a respective one of the plurality of light emitting regions in the light guide grating layer based on the actual viewing distance, thereby determining a pitch of the plurality of light emitting regions in the light guide grating layer, and
selectively controlling a plurality of target light guide bars out of the plurality of light guide bars to emit light whereas other light guide bars of the plurality of light guide bars are controlled not to emit light, thereby forming the grating of the plurality of light emitting regions spaced apart by the plurality of light non-emitting regions;
wherein the respective one of the plurality of light emitting regions comprises at least one of the plurality of target light guide bars that is controlled to emit light.

13. The method of claim 12, wherein determining the width of the respective one of the plurality of light emitting regions in the light guide grating layer based on the actual viewing distance comprises:
acquiring the actual viewing distance; and determining the width of the respective one of the plurality of light emitting regions in the light guide grating layer based on the actual viewing distance.

14. The method of claim 12, wherein selectively controlling the plurality of target light guide bars out of the plurality of light guide bars to emit light comprises:
generating a first control signal based on the pitch determined;
transmitting the first control signal; and
based on the first control signal, selectively controlling the plurality of target light guide bars out of the plurality of light guide bars to emit light.

15. The method of claim 12, further comprising, upon receiving a signal indicating a two-dimensional image display mode, controlling the light guide grating layer to form a substantially continuous single light emitting region throughout the light guide grating layer.

16. The method of claim 15,
wherein controlling the light guide grating layer to form the substantially continuous single light emitting region throughout the light guide grating layer comprises:
upon receiving the signal indicating the two-dimensional image display mode, generating a second control signal;
transmitting the second control signal; and
controlling all of the plurality of light guide bars to emit light, thereby forming the substantially continuous single light emitting region throughout the light guide grating layer.

17. A method of fabricating a display panel, comprising:
providing a base substrate; forming a light guide grating layer on the base substrate;
forming a light guide grating pitch adjuster;
forming an array substrate;
forming a counter substrate;
assembling the army substrate and the counter substrate into a cell;
wherein the light guide grating layer is formed on a side of the array substrate distal to the counter substrate;
the light guide grating layer in a three-dimensional image display mode is configured to have a plurality of light emitting regions and a plurality of light non-emitting regions alternately arranged, thereby forming a grating;
the light guide grating pitch adjuster configured to adjust a pitch of the plurality of light emitting regions in the light guide grating layer in response to a change of an actual viewing distance between a plurality of view zones and the display panel;
the light guide grating layer is configured to emit light from the plurality of light emitting regions, and configured not to emit light form the plurality of light non-emitting regions, thereby displaying a three-dimensional image in the display panel;
forming the light guide grating layer comprises forming a plurality of light guide bars;
wherein a respective one of the plurality of light guide bars is formed to extend along a direction substantially parallel to a scanning direction of a plurality of gate lines in the display panel;
a length direction of the respective one of the plurality of light guide bars is substantially perpendicular to the scanning direction of the plurality of gate lines in the display panel;
the light guide grating pitch adjuster is configured to adjust a width of a respective one of the plurality of light emitting regions in the light guide grating layer in response to a change in the actual viewing distance;
the light guide grating pitch adjuster is configured to selectively control a plurality of target light guide bars out of the plurality of light guide bars to emit light whereas other light guide bars of the plurality of light guide bars are controlled not to emit light, thereby forming the grating of the plurality of light emitting regions spaced apart by the plurality of light non-emitting regions; and
the respective one of the plurality of light emitting regions comprises at least one of the plurality of target light guide bars that is controlled to emit light.

* * * * *